(12) United States Patent
Dennis

(10) Patent No.: US 7,217,184 B2
(45) Date of Patent: May 15, 2007

(54) ELECTRICAL GENERATOR FLUID-FLOW-COOLANT FILTRATION METHOD

(75) Inventor: Michael R. Dennis, Scappoose, OR (US)

(73) Assignee: MJD Innovations, L.L.C., Scappoose, OR (US)

( * ) Notice: Subject to any disclaimer, the term of this patent is extended or adjusted under 35 U.S.C. 154(b) by 0 days.

(21) Appl. No.: 11/409,580

(22) Filed: Apr. 24, 2006

(65) Prior Publication Data

US 2006/0192049 A1    Aug. 31, 2006

Related U.S. Application Data

(63) Continuation of application No. 10/757,880, filed on Jan. 14, 2004, now Pat. No. 7,150,431.

(51) Int. Cl.
*B64D 31/00*    (2006.01)
*B60H 3/06*    (2006.01)

(52) U.S. Cl. .................... 454/111; 244/53 B; 244/53 R

(58) Field of Classification Search ................. 454/71, 454/74, 76, 93, 111, 156, 158; 244/53 B, 244/53 R, 57
See application file for complete search history.

(56) References Cited

U.S. PATENT DOCUMENTS

| | | | | |
|---|---|---|---|---|
| 4,158,449 | A * | 6/1979 | Sun et al. | 244/136 |
| 5,662,292 | A * | 9/1997 | Greene et al. | 244/53 B |
| 6,123,751 | A * | 9/2000 | Nelson et al. | 95/268 |
| 6,402,812 | B1 * | 6/2002 | Perrotta et al. | 95/95 |
| 6,595,742 | B2 * | 7/2003 | Scimone | 415/121.2 |

* cited by examiner

*Primary Examiner*—Gregory Wilson
(74) *Attorney, Agent, or Firm*—Jon M. Dickinson, PC; Robert D. Varitz, PC

(57) ABSTRACT

A ventilating and particle-filtering airflow methodology for managing the flow of air to the electrical sliding-contact zone of an on-board aircraft (vehicle) electrical generator. Conduit structure collects intaken air during aircraft (vehicle) engine operation, filters this air to capture and prevent the passage of particles, and directs filtered airflow to that brush region through a close-coupled fluid-flow connection which closes upon and substantially isolates (in terms of incoming airflow) that region. Water drainage is provided for in a region near where filtering takes place. The filtered airflow is substantially the only airflow admitted to this protected region.

9 Claims, 1 Drawing Sheet

ELECTRICAL GENERATOR FLUID-FLOW-COOLANT FILTRATION METHOD

CROSS REFERENCE TO RELATED APPLICATION

This application is a continuation of U.S. patent application Ser. No. 10/757,880, filed Jan. 14, 2004, for "Electrical Generator Fluid-Flow-Coolant Filtration", now U.S. Pat. No. 7,150,431 B2, granted Dec. 19, 2006, the entire content of which is hereby incorporated herein by reference.

BACKGROUND AND SUMMARY OF THE INVENTION

This invention relates to management of the flow of coolant fluid (typically air) to an electrical generator in a vehicle, and in particular to the filtering of such flow which is directed ultimately to the sliding-contact electrical interface region, or zone, in such a generator. While the invention is believed to have applicability in a number of different vehicle settings, a preferred and best mode embodiment of, and manner of practicing, the invention are described herein generally in the context of aircraft, and more particularly in the context of a specific aircraft model wherein the invention has been found to offer significant utility.

In this context, a problem has existed with regard to the operation of certain aircraft relating to unexpectedly early, catastrophic failure of on-board electrical generators—a failure which potentially can be quite dangerous. Not only that, such generators, i.e., those employed in aircraft, can be very expensive pieces of equipment, and a catastrophic failure almost inevitably leads to a requirement for wholesale, costly replacement. The magnitude of this expense problem multiplies appreciably where an aircraft employs more than one electrical generator.

The specific failure herein being referred to involves catastrophic wear in what can be thought of as the electrical sliding-contact zone in a generator of the type mentioned—the zone involving the contact interface between brushes and a commutator, or between brushes and rings. A normal operating condition which is expected in this region is relatively long-term modestly progressive wear of the brushes—components which are expected to require replacement only occasionally, and replacement at a relatively low cost. What is definitively not expected is rapid, noticeable wear of a commutator or rings, let alone early catastrophic wear of these components which are usually and decidedly not intended to require major repair or replacement during the normal, expected working lifetime of a generator. Even more strikingly puzzling is the occurrence of such wear under circumstances wherein there is little evidence of brush wear. Yet, this is exactly the startling manifestation which characterizes the issue to which the present invention is directed.

Until the making of the discovery which has led to the creation of the present invention, experts were baffled by the mentioned wear problem, and indeed even more baffled by the fact that none could discern the cause of the problem. Deciphering of the problem was, to say the least, not intuitive.

Discovery came to me eventually by my taking a very close look at the substantially "non-worn" brushes. This look ultimately enabled me to uncover the culprit. Embedded in the contact face of each examined brush was a dense population of tiny abrasive grit whose presence, I soon determined, effectively reversed the intended, normal wear behavior of the electrical sliding-contact interface region in the failed generator which I was examining. The brushes, with this "illusive" embedded grit in place, were effectively acting in generators like abrader tools—grinding and machining away the working surface(s) of associated commutators/rings. Further examination and contemplation revealed that the primary source of this grit was engine-exhaust particulate content which found its way into the flow of coolant air (fluid) directed toward the contact interface region of the brushes.

Accordingly, and in response to these discoveries, proposed by the present invention is a special ventilation, or coolant, fluid-flow management methodology implemented by a system which effectively eliminates these discovered exhaust-grit problems.

Further elaborating, in the operating environment of an aircraft, and with the system illustrated herein which implements the present invention installed and operating, when the engine is running, and the aircraft is flying, an air intake collects an inflow of air and feeds it into the intake end of a fluid conduit system, the discharge end of which (or ends if more than one electrical generator is/are involved) is/are tightly coupled to (via a fluid-flow connection which closes upon) the electrical sliding-contact (brush, etc.) zone(s) in the generator(s). Intermediate the intake and discharge ends of this special implementing conduit system, in accordance with the invention, is a filter, or a filter structure, which blocks the passage of harmful grit, such as exhaust grit, which may be present in this air flow. Such grit, as I have discussed, puts the electrical sliding-contact zone of an aircraft generator at serious risk—evidenced by surprising degradation of commutator or ring structure in the generator.

Additionally, upstream from this filter structure is an air-flow expansion chamber which acts to retard air-flow velocity, and to expand the cross-sectional area of this retarded flow, thus to improve filtering action. Adjacent the base of the filter structure is a gravity-functioning trap and drain which collects and discharges moisture in the fluid flow adjacent the filter structure.

Installation and operation of this system which carries out the methodology of the invention effectively eliminates the catastrophic wear and failure problem to which the invention is addressed.

These and other important features and advantages which are offered by the methodology of the present invention will become more fully apparent now as the description which shortly follows is read in conjunction with the accompanying drawings.

DETAILED DESCRIPTION OF THE INVENTION

Figure 1:
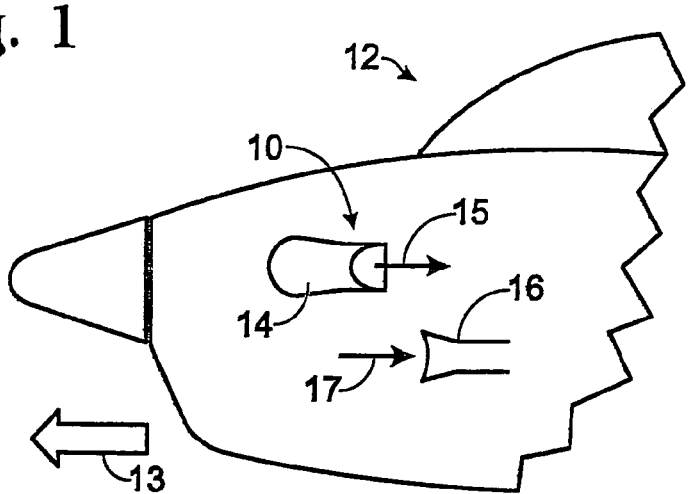
FIG. 1 is a simplified, fragmentary side-elevation (from the outside) of the nose engine compartment of an aircraft which is equipped with a fluid-flow management system constructed to implement, and thus to function in accordance with, a preferred and best-mode embodiment of, and manner of practicing, the present invention.

Turning now to the drawings (both figures), indicated generally at 10 in FIG. 1 is the nose engine compartment of an aircraft 12 in which a preferred and best mode embodiment of the invention has been installed (the engine is not illustrated). This embodiment implements the methodology of the invention. As was mentioned earlier, while the present invention may well have utility in various different kinds of vehicles, it has been found to furnish significant utility in a particular aircraft model, and thus is principally illustrated and described herein in such an aircraft. This aircraft is a Pilatus model PC-12 aircraft, and accordingly that specific model of aircraft is referred to herein for the purpose of disclosure and illustration of the invention.

Exposed on the outside of the engine housing provided for nose compartment 10 in FIG. 1 are an engine exhaust outlet 14. Disposed rearwardly thereof (to the right in FIG. 1), there is also provided an air-flow inlet, or intake, 16. Flight direction for aircraft 12 is indicated by an arrow 13, exhaust direction by an arrow 15, and airflow intake direction by an arrow 17.

Intake 16 is coupled to an on-board ventilating air-flow management system constructed in accordance with the present invention to implement the methodology of the invention. This system is generally indicated at 18 in FIG. 2. In aircraft 12, system 18 provides airflow management for two electrical generators (or generating devices) shown generally at 20, 22 in FIG. 2. The specific downstream location in nose 10 of air intake 16 relative to exhaust outlet 14 is not a configuration dictated by the present invention. Rather, it is dictated by the particular manufacturing architecture which has been chosen by the maker of the aircraft model mentioned above. It should be understood that the methodology of the present invention is not limited to this specific aircraft model, and is useful no matter what the engine-exhaust/air-intake geometry turns out to be. The location of air intake 16 is referred to herein as being functionally upstream from the locations of generators 20, 22.

Figure 2:
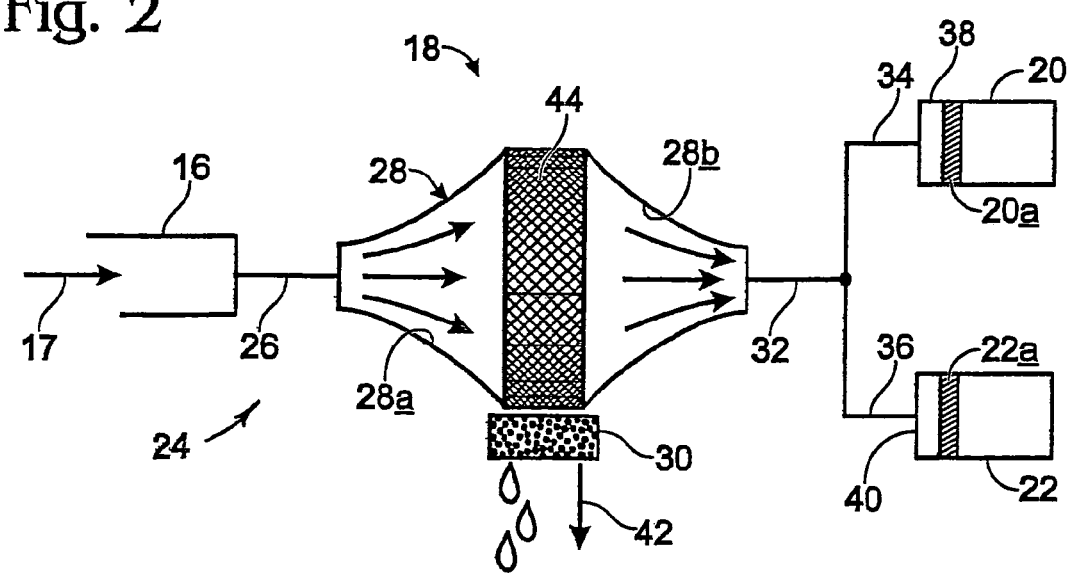
FIG. 2 is a schematic illustration of the methodology-implementing fluid-flow management system which is installed in the aircraft of FIG. 1.

Looking specifically at FIG. 2, system 18 further includes a fluid-flow conduit structure 24, which, as illustrated herein, includes (a) an intake conduit section 26 which defines an intake end in this system, and which is fluid coupled to air intake 16, (b) a flow velocity-modifying structure 28 having a flow-expansion chamber, or plenum, 28a coupled to conduit section 26, and a flow contraction chamber, or plenum, 28b, (c) a gravity-operable liquid trap and drain structure 30 disposed adjacent the base of structure 28 intermediate chambers 28a, 28b, and (e) a pair of discharge conduit sections 34, 36 which collectively define a discharge end (or ends) for the conduit structure, and which interconnect conduit section 32 and generators 20, 22, respectively. Specifically, conduit sections 34, 36 couple ventilating airflow through suitable connectors 38, 40, respectively, to the brush regions, also called the electrical sliding-contact zones, 20a, 22a, respectively in generators 20, 22. Zones 20a, 22a are shown as shaded regions in FIG. 2. Connectors 38, 40 may be of any suitable design appropriate to the configurations of the generators, and do not form part of the present invention. In the absence of connectors 38, 40 which close upon zones 20a, 22a, these zones, undesirably, would be nominally exposed to otherwise uncontrolled, un-grit-filtered airflow. Closure of connections 38, 40 on zones 20a, 22a, respectively, in addition to being discussed herein, is illustrated graphically in FIG. 2.

Disposed within structure 28, just above trap and drain structure 30, which drains liquid to the outside of aircraft 12 as indicated by arrow 42, is a filter, or filter structure, 44. This filter is preferably structured to block the passage into conduit section 32, and thus ultimately into zones 20a, 22a via closure connectors 38, 40, of substantially all particles, such as the mentioned, damaging grit particles. The specific structure of the filter is conventional, and is not part of the present invention. A filter structure which has been found to work well in the specific aircraft mentioned above is a foam filter made by Brackett Aero Filters, Inc., of Kingman, Ariz., Model No. BA-5110.

With this arrangement as just described, substantially all ventilating airflow which is provided to zones 20a, 22a is delivered by system 18, and through filter 44, and is then close-coupled to these zones through connections 38, 40.

Freely choosable by one implementing the present invention is the specific location for filter 44. Cleaning and/or replacing of a filter is accommodated by the fact that structure 28 is selectively openable (in any suitable manner). Expansion of airflow in chamber 28a to slow down airflow velocity, and to enlarge the cross-sectional area of that flow, immediately upstream from the filter aids by causing airflow to spread out across a broad filtration surface, thus to improve filtration effectiveness and operational filter lifetime. Gravity liquid trap and drain structure 30 discharges collected moisture/liquid downwardly through an appropriate drain structure (not shown) disposed on the underside of aircraft nose 10.

As stated earlier herein, the methodology of this invention effectively eliminates the serious catastrophic failure problem previously described above herein. The particular system shown and described herein which implements this methodology is quite simple in construction, and can be quite inexpensive in its making, installation and implementation. It can very easily be incorporated not only in new construction, but also as retrofit structure in an existing aircraft.

The methodology of the invention can be described as (a) intaking a flow of air at a location which is functionally upstream from an electrical generator in an aircraft, (b) filtering the thus intaken airflow to block the passage of entrained solids (particles), and (c) directing the filtered airflow in a close-coupled manner into the electrical sliding-contact zone of the electrical generator (or generators) in the aircraft, whereby that particle-and-grit-filtered flow, as a consequence of such close-coupling, provides substantially all of the ventilating air-flow which enters that zone. Where the word "aircraft" is employed herein, it should be understood to include other forms of vehicles wherein the problem addressed by the present invention may exist.

While a preferred and best mode embodiment of, and manner of practicing, the invention have thus been described and illustrated herein, it is appreciated that variations and modification may be made without departing from the spirit of the invention.

I claim:

1. A method for managing ventilating airflow for the electrical sliding-contact zone in an aircraft rotary electrical generating device comprising
   intaking, during operation of the aircraft engine, a flow of air at an airflow location which is functionally upstream from the location of the electrical generating device,
   filtering the thus intaken flow of air to block the passage of particulates entrained in that flow, thus to create a filtered airflow, and
   directing the created, filtered airflow into the mentioned electrical sliding-contact zone in a maimer whereby the filtered airflow is substantially all of the ventilating airflow which enters the zone.

2. The method of claim 1 which further comprises, prior to filtering, reducing the velocity, and expanding the cross-sectional area, of the intaken airflow.

3. The method of claim 1 which further comprises, before performing said directing step, trapping and draining liquid entrained in the intaken airflow.

4. For use in a vehicle having an engine, an exhaust structure which is furnished for that engine, and an electrical generating device possessing a nominally exposed electrical sliding-contact interface zone, a method for protecting that zone from particulate exhaust effluent emitted by such exhaust structure, said method comprising,
  providing a substantially exclusive airflow system which lies operatively intermediate the exhaust structure and the zone for defining substantially the full airflow which reaches that zone, and
  within that system, performing particulate filtering at a point which is upstream from the zone.

5. The method of claim 4 with respect of which the subject vehicle is an aircraft.

6. A method for managing ventilating airflow for the electrical sliding-contact zone in an engine-driven electrical generating device comprising
  intaking, during operation of an engine, a flow of air at an airflow location which is functionally upstream from the location of the electrical generating device,
  expanding a cross-sectional area of the flow of air,
  filtering the thus intaken and expanded flow of air to block the passage of particulates entrained in that flow, thus to create a filtered airflow,
  contracting the cross-sectional area of the filtered airflow, and
  directing the created, filtered airflow into the mentioned electrical sliding-contact zone in a maimer whereby the filtered airflow is substantially all of the ventilating airflow which enters the zone.

7. The method of claim 6 which further comprises, prior to filtering, reducing the velocity of the intaken airflow and, prior to said directing, increasing the velocity of the filtered airflow.

8. The method of claim 6 which further comprises, before performing said directing step, trapping and draining liquid entrained in the intaken airflow.

9. The method of claim 6 wherein the engine is an aircraft engine mounted, with the electrical generating device, in an aircraft.

* * * * *